(12) United States Patent
Garcia Laja et al.

(10) Patent No.: US 7,810,758 B2
(45) Date of Patent: Oct. 12, 2010

(54) ARRANGEMENT FOR COUPLING A COUPLING PIVOT FOR A TRIMMABLE HORIZONTAL STABILISER TO THE TAIL FUSELAGE OF AN AIRCRAFT

(75) Inventors: Agustín Garcia Laja, Madrid (ES); Carlos Garcia Manzano, Madrid (ES)

(73) Assignee: Airbus Operations, S.L., Getafe (Madrid) (ES)

( * ) Notice: Subject to any disclaimer, the term of this patent is extended or adjusted under 35 U.S.C. 154(b) by 348 days.

(21) Appl. No.: 11/785,729

(22) Filed: Apr. 19, 2007

(65) Prior Publication Data

US 2008/0164375 A1 Jul. 10, 2008

(30) Foreign Application Priority Data

Apr. 28, 2006 (ES) ................. 200601141

(51) Int. Cl.
   *B64C 1/26* (2006.01)
(52) U.S. Cl. ........................ 244/131; 244/119
(58) Field of Classification Search ............ 244/131, 244/129, 120, 129.1, 123.1, 123.14, 123.3, 244/124, 123.7, 123.8, 123.9
   See application file for complete search history.

(56) References Cited

U.S. PATENT DOCUMENTS

| | | | |
|---|---|---|---|
| 2,378,885 A * | 6/1945 | Watter ................ | 244/117 R |
| 3,321,019 A | 5/1967 | Dmitroff et al. | |
| 3,466,211 A * | 9/1969 | McHugh ................ | 156/123 |
| 3,499,622 A * | 3/1970 | Surcin et al. ........... | 244/130 |
| 3,594,851 A * | 7/1971 | Swatton ................ | 16/276 |
| 5,692,704 A * | 12/1997 | Buttgereit et al. ....... | 244/119 |
| 6,655,635 B2 * | 12/2003 | Maury et al. ........... | 244/131 |

FOREIGN PATENT DOCUMENTS

ES   2 277 774   7/2007

* cited by examiner

*Primary Examiner*—Tien Dinh
(74) *Attorney, Agent, or Firm*—Wenderoth, Lind & Ponack, L.L.P.

(57) ABSTRACT

A device for coupling a coupling pivot for a trimmable horizontal stabilizer to the tail fuselage of an aircraft, with an inner plate, an outer plate with first fastening holes and first passage holes in the inner plate respectively facing second fastening holes and second passage holes in the outer plate for the passage of a coupling pivot of the horizontal stabilizer, and with an upper lug and a lower lug respectively located above and below a cut-out for the horizontal stabilizer. The lugs are integral with separate reinforced zones of the covering in respective neighboring areas of the cut-out, in such a way that the plates between them clasp the respective reinforced zones in which the lugs are provided.

19 Claims, 5 Drawing Sheets

ARRANGEMENT FOR COUPLING A COUPLING PIVOT FOR A TRIMMABLE HORIZONTAL STABILISER TO THE TAIL FUSELAGE OF AN AIRCRAFT

BACKGROUND OF THE INVENTION

I. Technical Field of the Invention

This invention relates to aeronautics and particularly to fastening systems for fittings at the rear of trimmable horizontal stabilizers of an aircraft.

II. Description of the Related Art

The fastening of a trimmable horizontal stabilizer in an aircraft with a low tail is usually carried out by means of three points. So that the plane of the horizontal stabilizer can trim the one or two most forward fastening points, it has to change its position vertically by means of a spindle in such a way that the stabilizer pivots on the other two support points which can be referred to as pivot points.

In conventional systems, the fastening of the two rear pivot points of the stabilizer is basically done by means of two solutions, namely, by means of a fitting joined to the central core of the closing frame of the cut-out provided for the passage of the near end of the horizontal stabilizer, or by means of a fitting integral with the core of the closing frame and in the beam of the cut-out and two flat plates which transmit the loads from the stabilizer to the frame and to the beam.

According to the first of these conventional solutions, the loads pass directly from the horizontal stabilizer to the stiffened plate which constitutes the central part of the closing frame of the cut-out. The main drawback of this solution is the load eccentricity existing in the fitting due to supporting vertical loads, which means that counter-fittings have to be located on the other side of the frame. Another of the main problems is that the axial loads also have to pass to the covering by means of counter-fittings. All these counter-fittings greatly increase the weight of the solution and increase the assembly time.

Moreover, and according to the second of these solutions, the lateral loads of the stabilizer are transmitted to the frame by means of bars which are connected to the beam which stiffens the frame while the vertical loads and those in the axial direction are respectively transmitted to the frame and to the beams of the cut-out by means of plates and the fittings. The union lugs allow free rotation, which prevents the plates from transmitting moments to the fittings. The main disadvantage of this solution is the complexity which the fastening fittings for the plates add to the union node, in itself already complex, between the beam of the cut-out, the frame and the beam that stiffens the frame. This solution is also very complex when it comes to wanting to use a composite material for its manufacture, since the manufacture of a fastening fitting of this kind in a composite material is virtually impossible at present.

SUMMARY OF THE INVENTION

The object of the present invention is to overcome the difficulties of the fastening systems involving the two rear pivot points of the stabilizer, by means of a device for coupling a coupling pivot for a trimmable horizontal stabilizer to the tail fuselage of an aircraft in which the tail fuselage comprises at least one frame and one external covering joined to the frame which comprises an inner plate with a first upper fastening hole, a first lower fastening hole and a first passage hole between the first upper fastening hole and the first lower fastening hole; and an outer plate with a second upper fastening hole, a second lower fastening hole and a second passage hole between the second upper fastening hole and the second lower fastening hole. The first fastening holes are respectively facing the second fastening holes (10b, 11b) while the first passage holes are facing the second passage holes in order to permit the passage of a coupling pivot of the horizontal stabilizer. Likewise, the arrangement comprises an upper coupling lug located between the upper fastening holes and a lower coupling lug located between the lower fastening holes, said lugs being respectively located above and below the cut-out provided for the horizontal stabilizer in the covering of the aircraft. The upper lug and the upper fastening holes form an upper space traversed by a first securing element, and the lower lug and the lower fastening holes form a lower space traversed by a second securing element. The above arrangement is characterized in that the coupling lugs are integral with separate reinforced zones of the covering of the tail fuselage in respective neighboring areas of the cut-out and of the frame, and the inner and outer plates between them clasp at least the respective reinforced zones in which the lugs are provided.

In this way, the vertical loads coming from the stabilizer pass directly to the covering, becoming converted into circumferential flows which are absorbed by the closing frame of the cut-out, while the loads in the axial direction are transformed into longitudinal flows in the covering and are absorbed by the beam of the cut-out. The lateral loads of the horizontal stabilizer are transferred to the beam that stiffens the closing frame of the cut-out by means of bars, preventing the plates from bending under load.

This way of absorbing loads is an advance compared to the already existing design solutions since the loads pass directly to the covering, and this distributes them appropriately among the different components (frames and beams of the cut-out) which stiffen it. Also, the fact of moving the fastening lugs of the pivot points of the horizontal stabilizer away from each other means that the moments arm of the horizontal stabilizer increases, successfully absorbing the balancing moments and yaw of the stabilizer with less loads at the fastening points.

The inner and outer plates preferably have an elongated rhomboid shape, and they can be metallic or made of a composite material such as carbon fiber.

In a preferred embodiment of the invention, the tail fuselage covering is a composite typically used for the covering of aircraft fuselages, such as for example a carbon fiber reinforced plastic (CFRP) and at least one of the reinforced zones is a zone with increased thickness of composite. Alternatively, or complementarily, at least one of the reinforced zones can be a zone in which is reinforcing plate has been applied, such as for example a plate made of a composite (applied by means of gluing or riveting, for instance), which can be of a carbon fiber reinforced plastic and/or a metallic plate such as a titanium plate.

The optimum position of the axis of the lug would be at the intersection between the plane of the closing frame of the cut-out and the horizontal plane corresponding to the beam of the cut-out (so that there is adequate load transfer to each of the elements), nevertheless, the union piece between the three main elements (beam of the cut-out, frame and reinforcing beam of the frame) is located at that height inside the covering. In order to avoid interference between the plates connecting the stabilizer and covering with the aforementioned union piece, the lugs of the covering have to be located a few millimeters below the horizontal plane of the beam of the cut-out.

As can be observed, the present invention overcomes the drawbacks of the state of the art and moreover presents a series of additional advantages. So, the present invention

- simplifies the design of the union node between the beam of the cut-out, the closing frame of the cut-out and the beam that stiffens this frame.
- permits the loads to pass directly to the covering, which distributes them in a simple way among the different components that stiffen it.
- simplifies the design of the closing frame of the cut-out, the height of which core will be determined by the union node and not by a fastening fitting for the plates.
- decreases the number of pieces making up the union node.
- is easily adapted to a carbon fiber design, something that is not the case with the old solutions (fastening fittings which are joined to the closing frame are easy to manufacture in machined aluminum but they imply complex preforms in composite).
- permits any kind of eccentricity to be eliminated, since the loads are applied directly to the plane of the frame.
- succeeds in absorbing the moments produced by the horizontal stabilizer in a way that is more efficient thanks to a larger moments arm.

Although the present invention is valid in metallic coverings, it offers greater advantages when the covering is manufactured in composite, since the reinforcement that the lug compels to be introduced in this zone can be integrated into the laminate itself. For example, when the covering has been manufactured by means of "fiber placement" techniques, there exist many different manufacturing options, for example

- reinforcements in "fiber placement", starting from the basis that it is the actual taping machine itself for the covering which tapes this reinforcement.
- covering plus titanium plate (which could be integral or riveted) if a double load path is required for reasons of fail-safe criteria.
- reinforcements in RTM integrated within the laminate.
- localized hybrid reinforcements (titanium plus prepreg for example).

BRIEF DESCRIPTION OF THE FIGURES

Described below are certain aspects of the invention on the basis of some drawings forming an integral part of this specification, and in which.

DETAILED DESCRIPTION OF THE INVENTION

Figure 1:
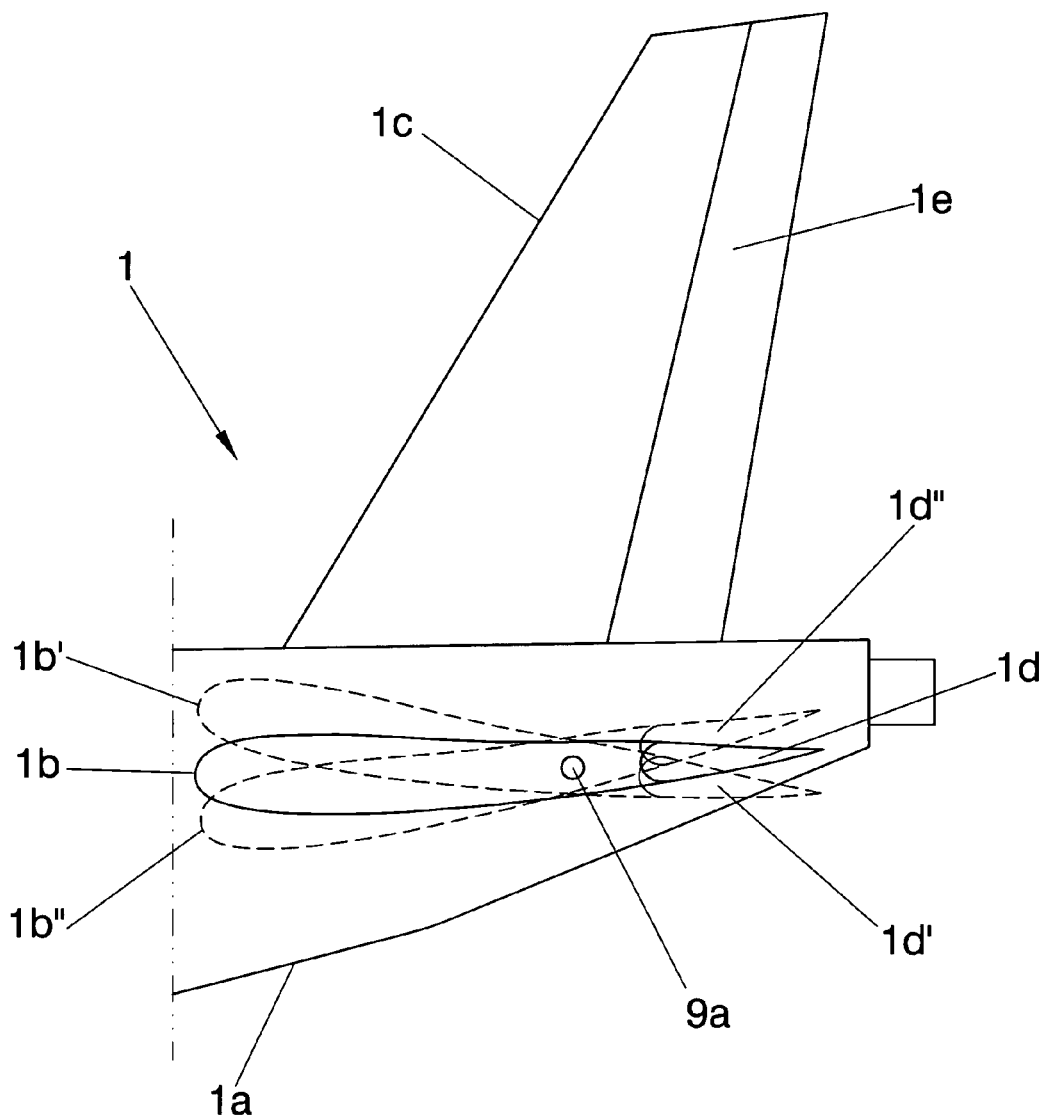
FIG. 1 is a schematic view in lateral elevation of the fuselage and of the empennage of an aircraft.
Figure 2:
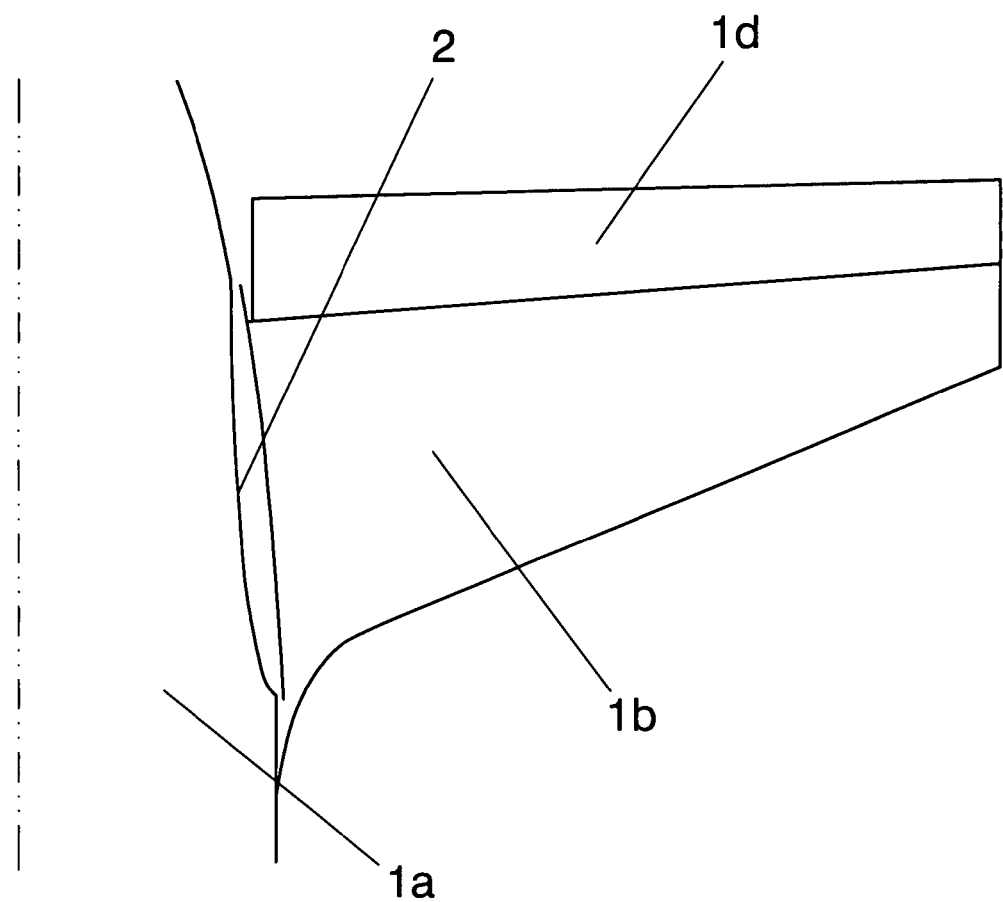
FIG. 2 is a schematic view in upper plan of the left part of the empennage shown in FIG. 1.

FIGS. 1 and 2 show the tail fuselage of a aircraft 1 in which is arranged a horizontal stabilizer 1b, with its elevator 1d, along with a vertical stabilizer 1c with its rudder 1e. The horizontal stabilizer 1c is trimmable in a way that is in itself conventional so that it pivots on the pivoting point 9a, in such a manner that, in a way that is also in itself conventional, the horizontal stabilizer 1b and the elevator 1d can adopt the positions shown with the references 1b', 1d', and 1b'', 1d'', respectively. Evidently, on the opposite side of the fuselage, not shown in FIG. 1, there is another horizontal stabilizer with an elevator, analogous to the left horizontal stabilizer 1b shown in FIG. 1.

Figure 3:
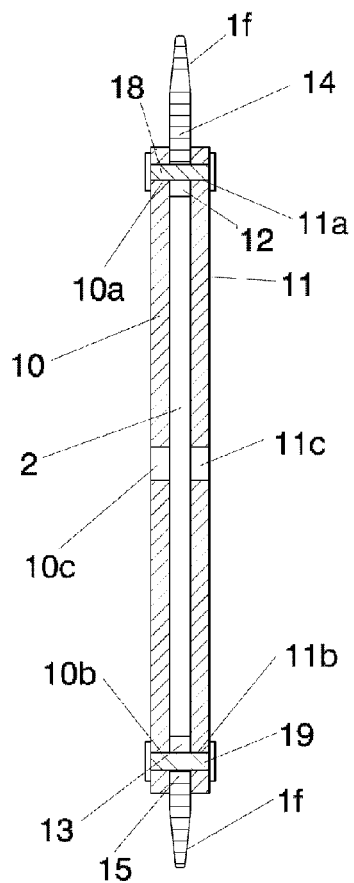
FIG. 3 is an embodiment of the lugs and plates for coupling of the pivot for the horizontal stabilizer.
Figure 4:
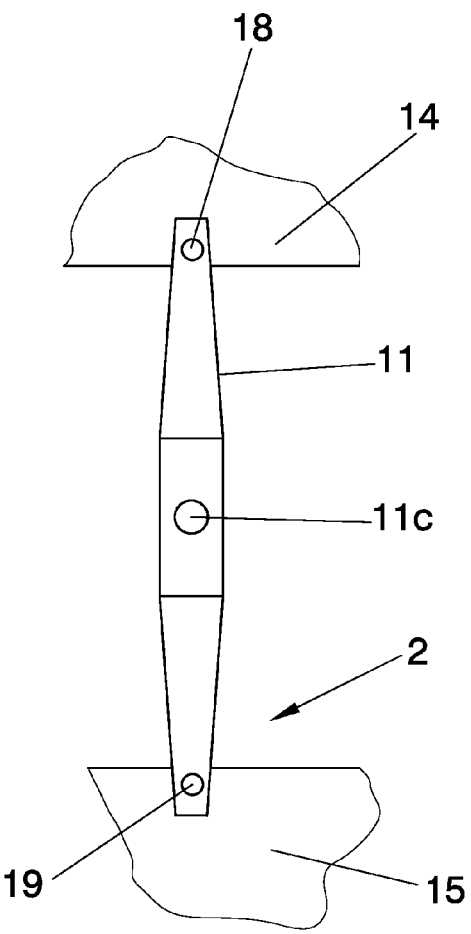
FIG. 4 is a front schematic view of the embodiment shown in FIG. 3.

In FIGS. 3 and 4, the array of lugs 12, 13 and plates 10, 11 can be seen in accordance with a first embodiment of the arrangement of the present invention. So, in this first embodiment, the arrangement comprises an inner plate 10 with a first upper fastening hole 10a, a first lower fastening hole 10b and a first passage hole 10c located between the first upper fastening hole 10a and the first lower fastening hole 10b. Likewise, provided coaxially with the lower plates 10 is an outer plate 11 with a second upper fastening hole 11a, a second lower fastening hole 11b and a second passage hole 11c between the second upper fastening hole 11a and the second lower fastening hole 11b. The first fastening holes 10a, 11a are respectively facing the second fastening holes 10b, 11b while the first passage holes 10c are facing the second passage holes 11c in order to permit the passage of a coupling pivot (not shown in FIGS. 3 and 4) of the horizontal stabilizer 1b.

The plates 10, 11 are connected upperly to an upper coupling lug 12, in such a way that the upper lug 12 is located between the upper fastening holes 10a, 11a of the plates 10, 11 and beneath with a lower coupling lug 13 which is positioned between the lower fastening holes 10b, 11b of the plates 10, 11. The upper lug 12 is arranged above the cut-out 2 (this being the cut-out for the horizontal stabilizer in the covering of the fuselage) and integrated into a reinforced zone 14 of the covering if of the tail fuselage 1b if the aircraft 1, while the lower lug 13 is arranged in a reinforced zone 15 of said covering below said cut-out 2.

The upper lug 12 and the upper fastening holes 10a, 11a form an upper space 16 (see FIG. 5) traversed by a first securing element 18. In turn, the lower lug 13 and the lower fastening holes 10b, 11b form a lower space 8 (see FIG. 5) traversed by a second securing element 19. In the embodiment shown in FIG. 3, the reinforced zones 14, 15 are both.

Figure 5:
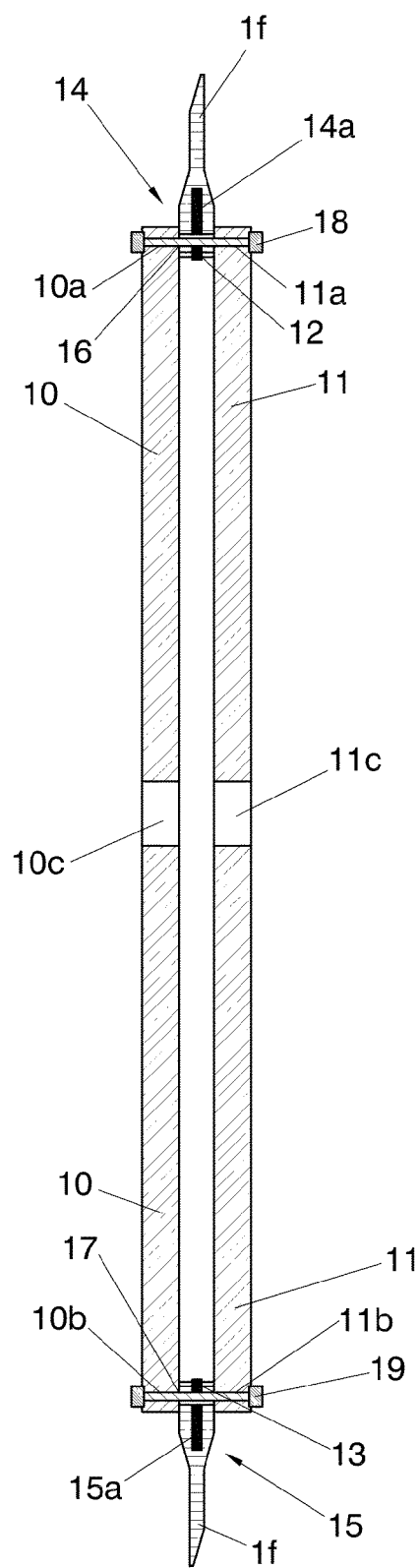
FIG. 5 is a second embodiment of FIG. 3 with the addition of reinforcement plates (14a and 15a)

FIG. 5 shows a second embodiment of the reinforced zones 14, 15 of the covering 1f. In accordance with this second embodiment, these zones 14, 15 are reinforced by separate inner titanium plates 14a, 15a.

Figure 6:
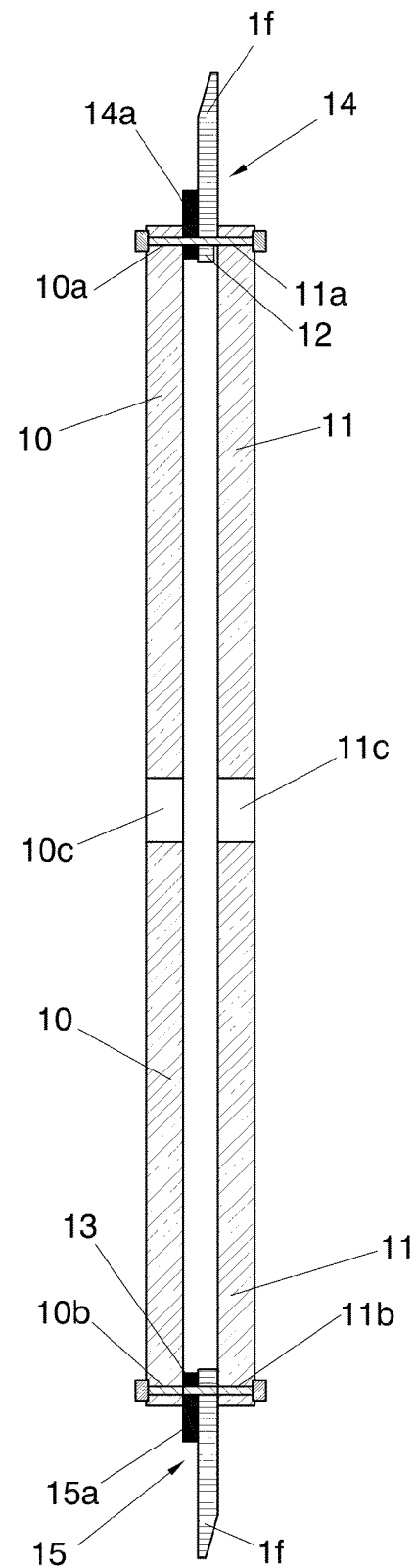
FIG. 6 is another embodiment of FIG. 3 with the reinforcement plates of FIG. 5 located in a different position.

FIG. 6 shows a third embodiment of the reinforced zones 14, 15, in which these zones are reinforced by external plates 14a, 15a which are semi-detached to the covering 1f in these zones 14, 15.

It can be seen that the covering 1f is joined to an upper frame 3 and to a lower frame 4 which are located in the same vertical plane and together form the closing frame of the respective cut-outs 2. In the vicinity of the upper and lower edges of each cut-out, separate beams 2a are provided which respectively extend towards the frames 3, 4. The upper frame 3 displays a stiffening beam 3a while the lower frame displays a stiffening beam 4a. Each beam 2a of the cut-out 2 is connected to one end of the corresponding stiffening beam 3a, 4a, and with the corresponding end of the respective frame 3, 4 by means of a union piece 3b.

Figure 7:
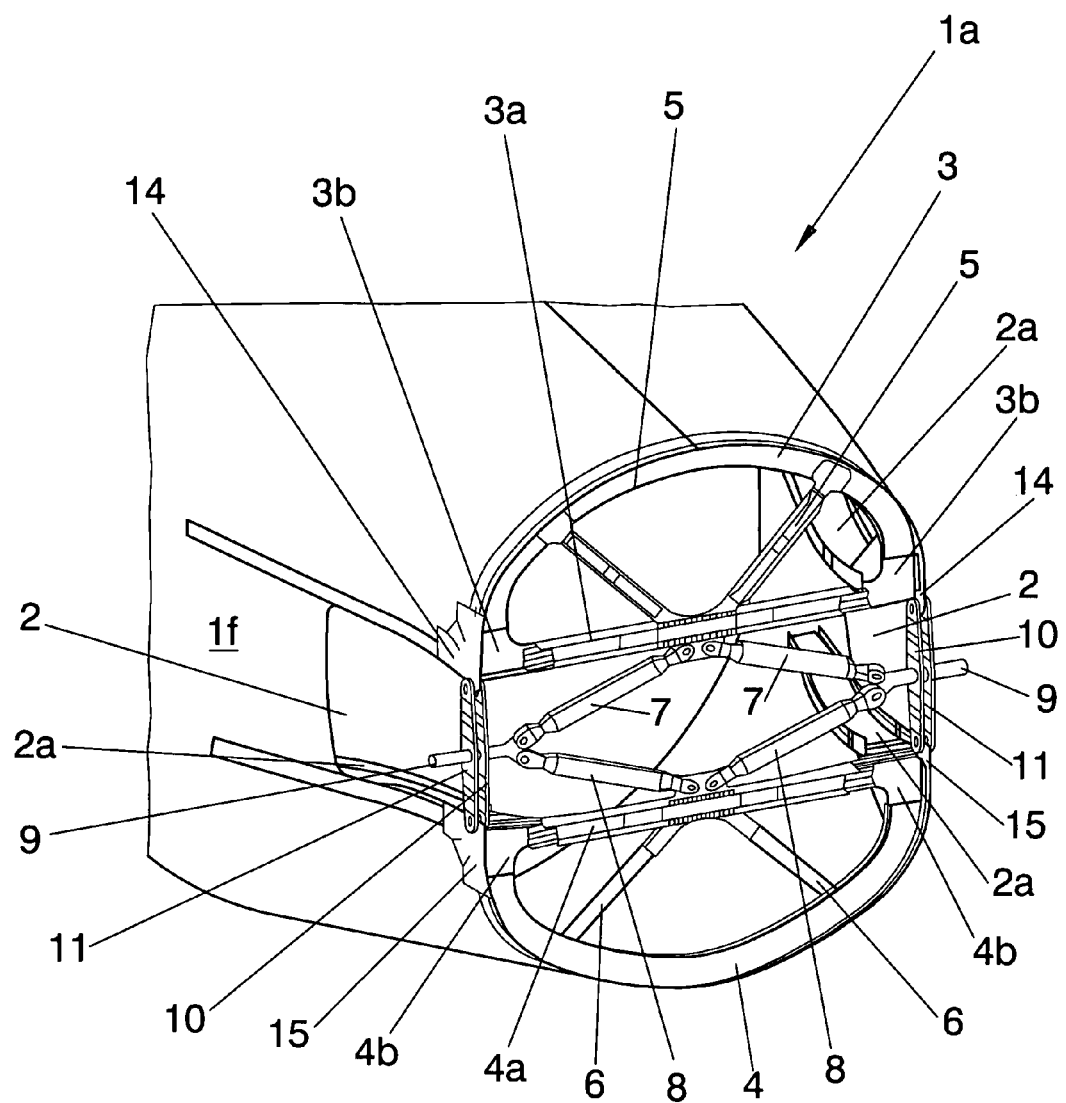
FIG. 7 is a schematic view in perspective and partially sectioned of the tail cone of an aircraft in which an embodiment of the present invention is fitted.

Emerging from the upper part of the central part of the stiffening beam 3a of the upper frame 3 are two upper coupling stays 5, which extend diverging towards the upper part of the frame 3 to which they are joined. Likewise, coupled in the lower part of the central part of the stiffening beam 3a are the first ends of separate upper coupling bars 7, whose opposite ends are respectively linked in the coupling pivot of one of the horizontal stabilizers (not shown in FIG. 7). Analogously, anchored to the lower part of the central part of the stiffening beam 4a of the lower frame 4 are two lower coupling stays which extend diverging towards the lower part of the frame 4 to which they are joined, while coupled to the lower part of the central part of the stiffening beam 4a are the first ends of separate lower coupling bars 8, whose opposite ends are respectively linked in the coupling pivot 5 of the respective horizontal stabilizer.

In the vicinity of each union piece 5 joining the upper frame 3 with the upper beam 2a of the cut-out 2 and with the stiffening beam 3a, the covering 1f displays respective reinforced zones 14, while in the vicinity of each union piece 5 joining the lower frame 4 with the lower beam 2a of the cut-out 2 and with the stiffening beam 4a, the covering 1f displays respective reinforced zones 15. The respective plates 10, 11 are anchored to the lugs provided in those reinforced zones in the manner already described with reference to FIGS. 3 to 6, in such a way that each coupling pivot 5 traverses the passage holes 10c, 11c of the unit formed by an inner plate 10 and an outer plate 11.

This system in which the vertical loads coming from the stabilizer pass directly to the covering 1f, becoming converted into circumferential flows which are absorbed by the closing frame 3, 4 of the cut-out 2, while the loads in the axial direction are transformed into longitudinal flows in the covering 1f and are absorbed by the beams 2a of the cut-out. Finally, the lateral loads of the horizontal stabilizer are transferred to the stiffening beams 3a, 4a and to the closing frame 3, 4 by means of bars 7, 8 and stays 5, 6, preventing the plates 10, 11 from bending under load.

The invention claimed is:

1. An arrangement for coupling a coupling pivot for a trimmable horizontal stabilizer to the tail fuselage of an aircraft, in which the tail fuselage comprises at least one frame and one outer covering joined to the frame, said arrangement comprising:
   an inner plate with a first upper fastening hole, a first lower fastening hole and a first passage hole between the first upper fastening hole and the first lower fastening hole;
   an outer plate with a second upper fastening hole, a second lower fastening hole and a second passage hole between the second upper fastening hole and the second lower fastening hole;
   the first upper and lower fastening holes facing the second upper and lower fastening holes, respectively, and the first passage hole facing the second passage hole so as to permit the passage of a coupling pivot of the horizontal stabilizer;
   an upper coupling lug located between the first and second upper fastening holes and a lower coupling lug located between the first and second lower fastening holes, said upper and lower lugs being respectively arranged above and below a cut-out provided for the horizontal stabilizer in a covering of the aircraft;
   a first securing element traversing an upper space formed by the upper lug and the first and second upper fastening holes; and
   a second securing element traversing a lower space formed by the lower lug and the first and second lower fastening holes;
   wherein
   the coupling lugs are integral with separate reinforced zones of the covering of the tail fuselage in respective neighboring areas of the cut-out and of the frame;
   the inner and outer plates clasp at least the respective reinforced zones in which the coupling lugs are provided therebetween.

2. An arrangement according to claim 1, wherein the covering of the tail is made of a composite material and at least one of the reinforced zones is a zone with increased thickness of composite material.

3. An arrangement according to claim 2, wherein the composite material is a carbon fiber reinforced plastic.

4. An arrangement according to claim 2, wherein at least one of the reinforced zones is a zone in which a reinforcing plate has been applied.

5. An arrangement according to claim 2, wherein the inner and outer plates have an elongated rhomboid shape.

6. An arrangement according to claim 2, wherein the outer plate and the inner plate are metallic.

7. An arrangement according to claim 2, wherein the outer plate and the inner plate are made of a carbon fiber material.

8. An arrangement according to claim 1, wherein at least one of the reinforced zones is a zone in which a reinforcing plate has been applied.

9. An arrangement according to claim 8, wherein the reinforcing plate is a plate made of a composite material.

10. An arrangement according to claim 9, wherein the composite material is a carbon fiber reinforced plastic.

11. An arrangement according to claim 8, wherein the reinforcing plate is a metallic plate.

12. An arrangement according to claim 11, wherein the metallic plate is a titanium plate.

13. An arrangement according to claim 8, wherein the composite material is a carbon fiber reinforced plastic.

14. An arrangement according to claim 8, wherein the inner and outer plates have an elongated rhomboid shape.

15. An arrangement according to claim 8, wherein the outer plate and the inner plate are metallic.

16. An arrangement according to claim 8, wherein the outer plate and the inner plate are made of a carbon fiber material.

17. An arrangement according to claim 1, wherein the inner and outer plates have an elongated rhomboid shape.

18. An arrangement according to claim 1, wherein the outer plate and the inner plate are metallic.

19. An arrangement according to claim 1, wherein the outer plate and the inner plate are made of a carbon fiber material.

* * * * *